May 28, 1946.    C. S. SCHROEDER    2,401,113
MOTORIZED TRUCK CONTROLLER
Filed May 15, 1942    2 Sheets-Sheet 1
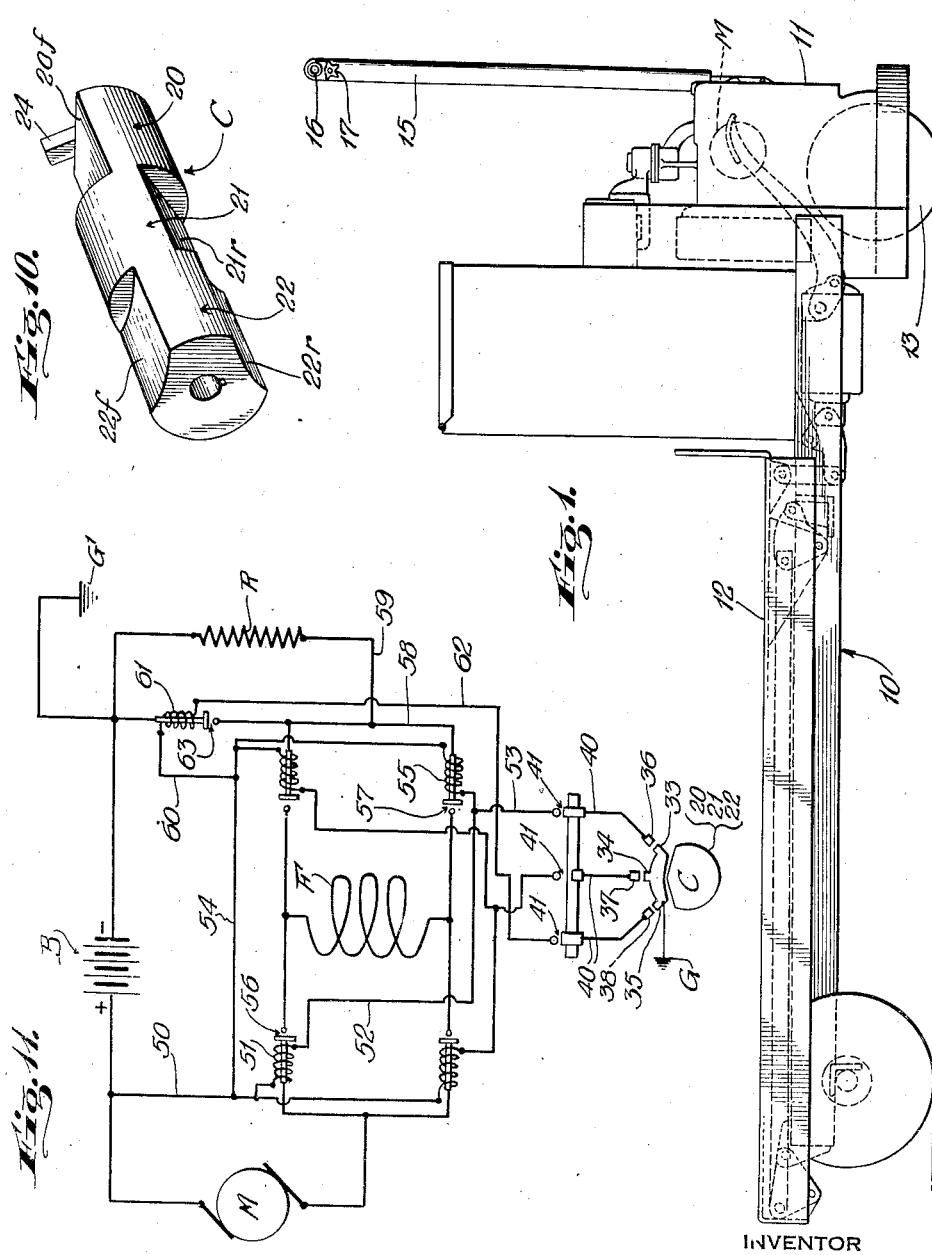
INVENTOR
C. S. Schroeder
BY
A. H. Golden
ATTORNEY May 28, 1946.  C. S. SCHROEDER  2,401,113
MOTORIZED TRUCK CONTROLLER
Filed May 15, 1942   2 Sheets-Sheet 2
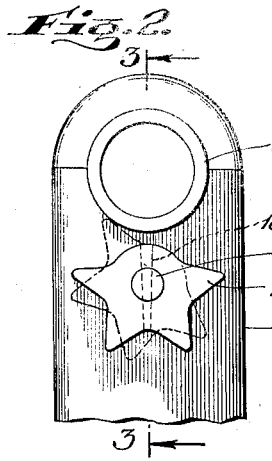
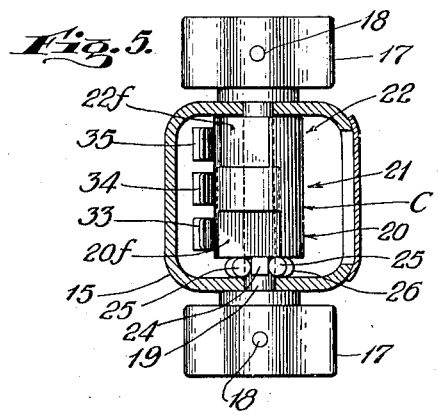
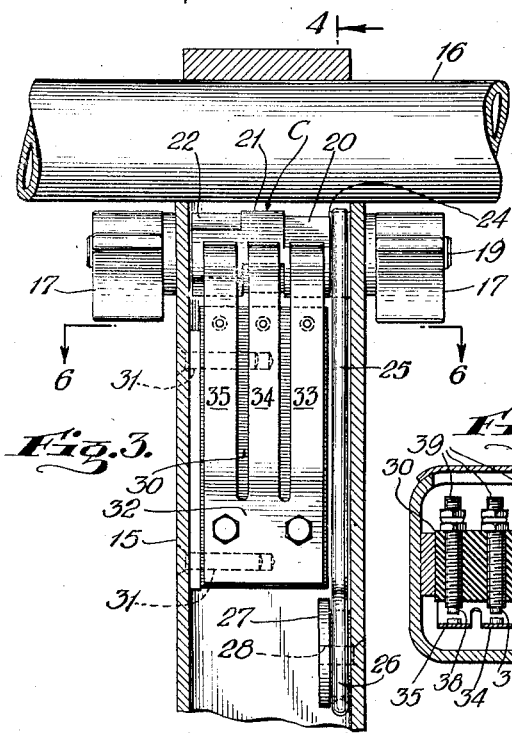
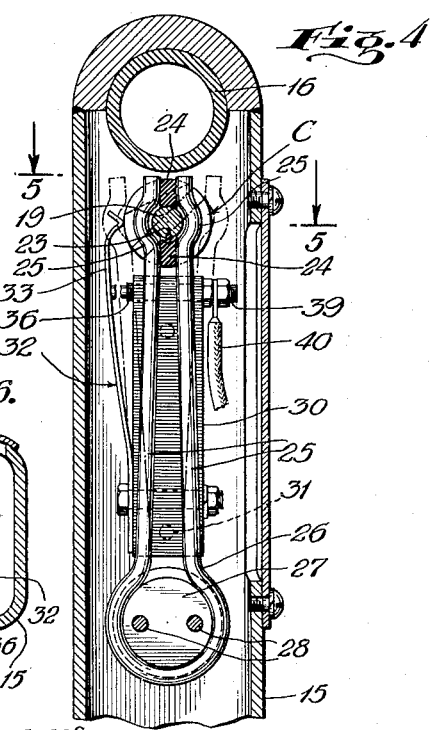
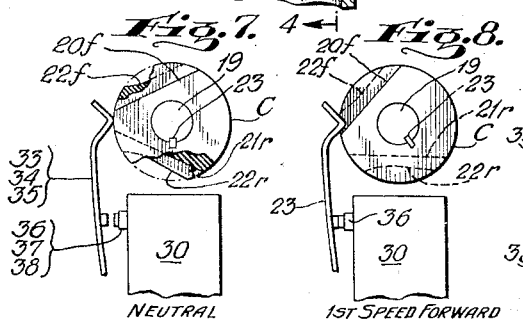
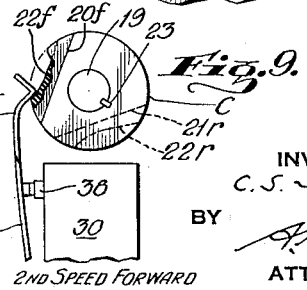
INVENTOR
C. S. Schroeder
BY
ATTORNEY Patented May 28, 1946

2,401,113

UNITED STATES PATENT OFFICE 2,401,113

MOTORIZED TRUCK CONTROLLER

Charles S. Schroeder, Philadelphia, Pa., assignor to The Yale & Towne Manufacturing Company, Stamford, Conn., a corporation of Connecticut Application May 15, 1942, Serial No. 443,044

5 Claims. (Cl. 200—5)

This invention relates to means for controlling the motor of a motorized industrial truck of the type shown and described in my application Serial No. 431,356 filed on February 18, 1942, for a Motorized lift truck. In the particular type of truck, a traction motor is used for driving a steering and traction wheel, with the steering wheel moved by a vertically swinging lever on the end of which is secured a handle to be held by the operator. In the truck shown in my application, the speed and direction of movement of the truck are controlled by switch mechanisms operated by rotation of sleeves mounted on the handle. Motor controlling sleeves are old in the art, and are not suitable for use on a truck steering lever because the mere swinging of the lever will effect the relative rotation of the sleeves on the handle. The invention of the present application resides in mechanism which I have conceived and developed, to be substituted for the sleeves of my earlier application to control the traction motor of an industrial truck of the class described.

A feature of my invention is the control of the motor by one or more finger pieces so located relatively to the handle secured at the end of the steering lever, as to be readily and easily operated by the fingers of the operator without interferring with the grasp the operator may have on the handle.

More particularly, it is a feature of my invention that a pair of rotating finger pieces are available for operation by the fingers of the operator, the two finger pieces being preferably movable together, and one being available when the operator's hand is at one side of the handle, while the other is available when the operator's hand is at the other side of the handle. Even more particularly, a feature of my invention resides in the arrangement of a switch mechanism for operation by a rotating shaft to which are secured finger pieces made available to the operator in any position of his hands on the handle of the truck.

A further feature of my invention resides in the mounting of the switch mechanism within a hollow portion of the steering lever adjacent the handle and preferably with operating finger pieces for the switch mechanism mounted at each side of the lever for actuation by the operator.

A further feature of my invention resides in the form of the particular switch mechanism whereby when the actuating shaft thereof is rotated in one direction from a control point, which preferably may be had through operation of either of the two finger pieces, a circuit is closed through the traction motor of the truck so that the truck will be in a first and forward speed. By rotation of the shaft in a reverse direction from a central point the motor will be placed in a first and reverse speed. By additional rotation of the shaft in either its forward or reverse directions, a second speed circuit will be closed with the direction being determined by the initial direction of rotation of the shaft.

I have thus descrbed the more important feature of my invention in order that its operation and relation to the prior art may be better understood. In the specification that follows, I shall refer to the drawings to describe the particular structure which I have chosen to utilize my contribution to the art. Those skilled in the art will fully appreciate that many similar structures may readily be developed for utilizing my basic concept and contribution to the art.

Referring now to the drawings Fig. 1 is a side view of a motorized industrial lift truck of the type for which my invention is especially adapted. Fig. 2 is an enlarged view of the upper end of the steering lever showing the relation of one of the finger pieces to the handle of the steering lever. Fig. 3 is a section of Fig. 2 taken along lines 3—3. Fig. 4 is a section of Fig. 3 taken along lines 4—4. Fig. 5 is a section taken along lines 5—5 of Fig. 4 while Fig. 6 is a section taken along lines 6—6 of Fig. 3. Figs. 7, 8 and 9 illustrate the relation of the switch mechanism to certain cams formed as part of a cam body mounted on the operating or control shaft of the switch. Fig. 10 is an isometric view of the cam body mounted on the shaft. Fig. 11 is a schematic view of the electric circuits controlled by the cams.

Referring now to the drawings and especially Fig. 1, reference numeral 10 refers generally to the main frame of a motorized truck of the class described, having a lifting head 11 and an elevating frame 12. The steering and traction wheel of the truck is designated by reference numeral 13 and it is driven by the electric motor M through a system of gearing which is not of importance so far as this application is concerned.

The steering lever for moving the steering and traction wheel 13 is designated by reference numeral 15, and is equipped with a handle 16 adapted to be grasped by the operator in the usual way understood by those skilled in the art. At each side of the lever 15, as is probably best shown in Figs. 2 and 3, there is mounted a finger piece 17 for operation by the fingers of the operator as the operator grasps the handle 16 that is secured to the upper end of the steering lever

15. Because of the particular relation of the finger pieces 17 to the handle 16, it is readily seen that when the operator's hand has grasped one end of the handle 16 his fingers are in a position to operate one of the finger pieces 17 while, when his hand is on the other end of the handle 16 his fingers are in a position to operate the other of the finger pieces 17.

Each of the finger pieces 17 is pinned through a pin 18 to an operating or control shaft 19, as is probably best seen in Figs. 2 and 5. The shaft 19 has secured thereon a cam body C which has formed thereon three cams as best shown in Fig. 10, where the cams are designated by reference numerals 20, 21 and 22. A key 23 is used to key the cam body C to the shaft 19 as will be readily appreciated. Keyed also to the shaft 19 is a centering lug 24 which may be formed as part of the cam body or which may simply be a separate part.

As is probably best shown in Fig. 4, the centering lug 24, which incidentally is made of some suitable insulation material, is yieldingly held in a particular central position by the arms 25 of a spring 26. The spring 26 in turn is mounted on a supporting stud 27 that through suitable screws 28 is fastened to the steering lever 15.

For cooperating with the cams, 20, 21 and 22, that incidentally are also formed of insulation material, there are a series of stationary and movable contact members forming part of a switch mechanism that is mounted within the upper hollow portion of the steering lever 15. Thus, a suitable insulation body 30 is secured by screws 31 within the lever 15. A metal contact member 32 is bolted to the insulation member 30, and is formed into three contact fingers denoted respectively by reference numerals 33, 34 and 35. These fingers are of spring like material and are normally flexed toward fixed contact points 36, 37 and 38 carried by the insulation body 30. The fixed contact points are the ends of terminals 39 from which run conductor wires 40 to other parts of the electric control circuits of the motor M as is probably best seen in Fig. 4.

Referring now more particularly to Figs. 5, 7 and 10, it will be noted that when the shaft 19 is held in its position of Fig. 7 by coaction of the legs 25 of the spring 26 with the lug 24, the high portions of the three cams 20, 21 and 22 will engage the fingers 33, 34 and 35 to hold those three fingers away from the three contact points 36, 37 and 38. Now, should the shaft 19 be rotated away from the position shown in full lines in Figs. 4, 5 and 7, so as to present the surface 20f of the cam 20 opposite the finger 33 as shown in Fig. 8, it is obvious that the finger 33 will move against the contact 36 to close a switch. Actually, the closing of a switch between the finger 33 and contact 36 effects the closing of the first speed forward circuit of the traction motor M as will be indicated presently.

Should the cam body C be rotated into the position of Fig. 9, the cam surface 22f of the cam 22 will move opposite the finger 35. This will allow the finger 35 to be sprung against the fixed contact 38, while, as shown in Fig. 9, contact 33 remains in its position of Fig. 8 against contact 36. The closing of a circuit between the finger 35 and contact 38 preferably effects the shunting out of a traction resistance in the traction motor circuit so as to condition the motor M for second speed operation. The direction of this operation will be forward since, before the circuit was closed at 35—38 a circuit was closed at 33—36 for conditioning the motor for forward operation, all as will be explained later.

Should the shaft 19 be rotated in a direction reverse to that which has been outlined, the surface 21r of the cam 21 of cam body C will be adapted to release the finger 34 so that it may move against the fixed contact 37. This will close the first speed reverse circuit. Continued rotation in the same direction will bring the surface 22r of the cam 22 opposite the finger 35 so as to allow the closing of the switch 35—38 in exactly the same manner that the said switch is closed through movement of the cam surface 22f opposite the finger 35. In other words, continued rotation of the shaft 19 and cam body C in either a forward or reverse direction, will effect the closing of a second speed circuit in the particular direction corresponding to the direction of rotation of the shaft 19 and cam body C.

Because of this arrangement of the parts, it will now be readily appreciated that when the operator has grasped the handle 16, he has but to rotate the shaft 19 and cam body C through one or the other of the finger pieces 17, to control the direction and speed of the traction motor. It is obvious that he may control the speed and direction of rotation of the traction motor regardless of which hand he uses, and regardless of the position of his hand. In addition, the direction of rotation of the finger pieces 17 is so related to the position of the operator and the lever 15 relatively to the truck, that the operator will not be confused as to the direction in which the finger pieces 17 must be rotated to obtain forward or rearward movement of the truck, as may be desired.

In order to clarify even further the operation of my invention, I shall now refer to Fig. 11 wherein is shown a schematic wiring diagram of a type with which my invention is readily usable. In Fig. 11 the field coil of the motor M is designated by reference letter F, the battery by reference letter B, and the traction resistance by reference letter R. The cam body is designated by letter C. The cams, fingers and fixed contacts are designated by the same reference numerals as used in the preceding figures. Additional control points which do not form part of the invention are designated by reference numeral 41, and for the purposes of the present invention it may be assumed that circuits are always closed at the particular points 41.

Assuming now that the shaft 19 is rotated into the position of Fig. 8 by one of the finger pieces 17 and that the cam surface 20f of cam body C moves opposite the spring finger 33, a circuit will be closed at 33—36. Current will now flow from the battery B through conductor 50, contactor coil 51, conductor 52, conductor 53, a control point 41, contact 36 and finger 33 to the ground G. At the same time current will flow from the battery B through the conductor 50, conductor 54, contactor coil 55, conductor 53, control point 41, contact 36, finger 33 to the ground G. The actuation of the contactor coils 51 and 55 will close circuits at points 56 and 57.

Current will now flow from the battery B through the motor M, point 56, the field F, point 57, conductor 58, conductor 59, the traction resistance R and to the ground G1. Obviously the motor will now be in its first speed, with the traction resistance in series with the field and the motor armature. Should the cam body C be rotated now to its position of Fig. 9 to bring the surface 22f of the cam 22 opposite the finger 35, a circuit will be closed at 35—38. The closing of this circuit will now allow the flow of current from the battery B through the conductor 50, the conductor 54, the conductor 60, contactor coil 61, conductor 62, a control point 41, fixed contact 38 and spring finger 35 to the ground G. It is obvious that the energizing of the contactor coil 61 will close a circuit at point 63. The closing of the circuit at 63 will effect the shunting out of the traction resistance R since current will now flow from the battery B through the motor M, point 56, the field F, point 57, conductor 58, point 63 and to the ground G1.

It is thought that it is unnecessary to indicate just what circuits will be closed for reverse operation of the traction motor M, since those circuits are identical in actuation and control with the circuits already outlined.

I now claim:

1. In a switch, a switch mechanism, a switch operating shaft mounted for rotation relatively to said mechanism and forming the operating means for said switch mechanism, at least three switches forming said switch mechanism, means for closing one of said switches when said shaft is rotated a predetermined degree in one direction from a central position, means for effecting the closing of the second switch when said shaft is rotated a predetermined degree in the opposite direction from said central position, and means for effecting the closing of said third switch when said shaft is rotated in either direction beyond said predetermined degree.

2. In a switch, a switch mechanism, a switch operating shaft mounted for rotation relatively to said switch mechanism and forming the operating means for said switch mechanism, at least three switches forming a part of said switch mechanism, a cam secured on said shaft for effecting the closing of one of said switches when said shaft is rotated a predetermined degree in one direction from a central position, a second cam secured on said shaft for effecting the closing of the second switch when said shaft is rotated a predetermined degree in the opposite direction from said central position, and a third cam secured on said shaft for effecting the closing of said third switch when said shaft is rotated in either direction beyond said predetermined degree.

3. In a switch, switch operating mechanism comprising at least three cams mounted for rotation as a unit, a first switch, means whereby said first switch is closed under the control of one of said cams when said cams are rotated a predetermined degree in one direction from a central position, a second switch, means whereby said second switch is closed under the control of a second cam when said cams are rotated a predetermined degree in the opposite direction from said central position, a third switch, and means whereby said third switch is closed under the control of the third cam when said cams are rotated in either direction beyond said predetermined degree.

4. In a switch, a switch operating member supported for movement in opposed directions from a central position, a switch, means whereby said switch is closed by movement of said member in one direction from said central position, a second switch, means whereby said second switch is closed by movement of said member in a reverse direction from said central position, a third switch, and means whereby said third switch is closed by movement of said member in either of said directions a predetermined degree beyond that required to close said first switches.

5. In a switch, a switch operating member mounted for rotation, a switch, a cam surface rotatable by said operating member for effecting the closing of said switch when said operating member is rotated in one direction from a central position, a second switch, a cam surface movable by said operating member for effecting the closing of said second switch when said operating member is rotated in a reverse direction from said central position, a third switch, and a cam surface movable by said operating member for effecting the closing of said third switch when said operating member is rotated in either direction a predetermined degree beyond that required to close said first switches.

CHARLES S. SCHROEDER.